United States Patent
Fujimoto et al.

(10) Patent No.: US 9,156,979 B2
(45) Date of Patent: Oct. 13, 2015

(54) INSULATED WIRE USING A RESIN COMPOSITION

(75) Inventors: Kenichiro Fujimoto, Hitachi (JP); Tomiya Abe, Hitachi (JP); Kentaro Segawa, Hitachi (JP); Hitoshi Kimura, Hitachi (JP); Katsuhisa Shishido, Hitachinaka (JP); Akira Suzuki, Hitachi (JP); Takuya Suzuki, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 456 days.

(21) Appl. No.: 12/277,986

(22) Filed: Nov. 25, 2008

(65) Prior Publication Data
US 2009/0136752 A1 May 28, 2009

(30) Foreign Application Priority Data

Nov. 26, 2007 (JP) .................................. 2007-304364

(51) Int. Cl.
| | |
|---|---|
| B32B 5/02 | (2006.01) |
| C08L 83/04 | (2006.01) |
| C08F 283/04 | (2006.01) |
| C08L 67/02 | (2006.01) |
| H01B 3/42 | (2006.01) |
| H01B 3/46 | (2006.01) |
| C08K 3/34 | (2006.01) |
| C08K 5/29 | (2006.01) |
| C08K 5/3492 | (2006.01) |

(Continued)

(52) U.S. Cl.
CPC . *C08L 67/02* (2013.01); *H01B 3/42* (2013.01); *H01B 3/423* (2013.01); *H01B 3/46* (2013.01); *C08K 3/346* (2013.01); *C08K 5/29* (2013.01); *C08K 5/34924* (2013.01); *C08K 5/523* (2013.01); *C08L 51/085* (2013.01); *Y10T 428/2933* (2015.01)

(58) Field of Classification Search
CPC ......................................................... H01B 7/00
USPC .......................................... 524/100; 523/506
See application file for complete search history.

(56) References Cited

U.S. PATENT DOCUMENTS 4,775,712 A * 10/1988 Sasaki et al. .................. 524/504
5,660,932 A 8/1997 Durston
(Continued)

FOREIGN PATENT DOCUMENTS

| EP | 0 707 031 A1 | 4/1996 |
|---|---|---|
| EP | 1 475 396 A1 | 11/2004 |

(Continued)

OTHER PUBLICATIONS

Machine Translation of JP 06240229 A.*
(Continued)

*Primary Examiner* — Jennifer Chriss
*Assistant Examiner* — Ricardo E Lopez
(74) *Attorney, Agent, or Firm* — Scully, Scott, Murphy & Presser, P.C.

(57) ABSTRACT

An insulated wire uses a resin composition. The insulated wire includes a conductor; and an insulating material provided on the conductor, the insulating material includes a polyester resin in 100 parts by weight, a non-bromine flame retardant agent in 1-30 parts by weight, a polyorganosiloxane core-graft copolymer in 1-50 parts by weight, an inorganic porous filler in 0.1-50 parts by weight; and a hydrolysis resistance modifier in 0.05-10 parts by weight.

9 Claims, 1 Drawing Sheet

(51) Int. Cl.
   *C08K 5/523*   (2006.01)
   *C08L 51/08*   (2006.01)

(56) References Cited

U.S. PATENT DOCUMENTS

| | | | |
|---|---|---|---|
| 2006/0063867 A1* | 3/2006 | Durairaj et al. | 524/115 |
| 2006/0211810 A1* | 9/2006 | Persigehl et al. | 524/502 |
| 2006/0247340 A1* | 11/2006 | Sato et al. | 524/100 |
| 2007/0185284 A1* | 8/2007 | Ok et al. | 525/425 |
| 2007/0225436 A1* | 9/2007 | Tamai et al. | 524/860 |
| 2007/0225441 A1 | 9/2007 | Wenz et al. | |

FOREIGN PATENT DOCUMENTS

| | | | |
|---|---|---|---|
| JP | 06240229 A * | 8/1994 | |
| JP | 2968584 | 8/1999 | |
| JP | 2002097374 A * | 4/2002 | |
| JP | 2002-343141 | 11/2002 | |
| JP | 2004-193117 | 7/2004 | |
| JP | 2004-204171 | 7/2004 | |
| JP | 3590057 | 8/2004 | |
| JP | 2004281057 A * | 10/2004 | |
| JP | 3650474 | 2/2005 | |
| JP | 2005-213441 | 8/2005 | |
| JP | 2006-011873 | 1/2006 | |
| JP | 2006-111655 | 4/2006 | |
| JP | 2006-152122 | 6/2006 | |
| WO | WO 91/06106 | 5/1991 | |
| WO | WO 94/27298 | 11/1994 | |

OTHER PUBLICATIONS

L.A. Hollingbery, T.R. Hull, The Fire Retardant Behaviour of Huntite and Hydromagnesite—A Review, Polymer Degradation and Stability 95 (2010) 2213-2225.*

* cited by examiner

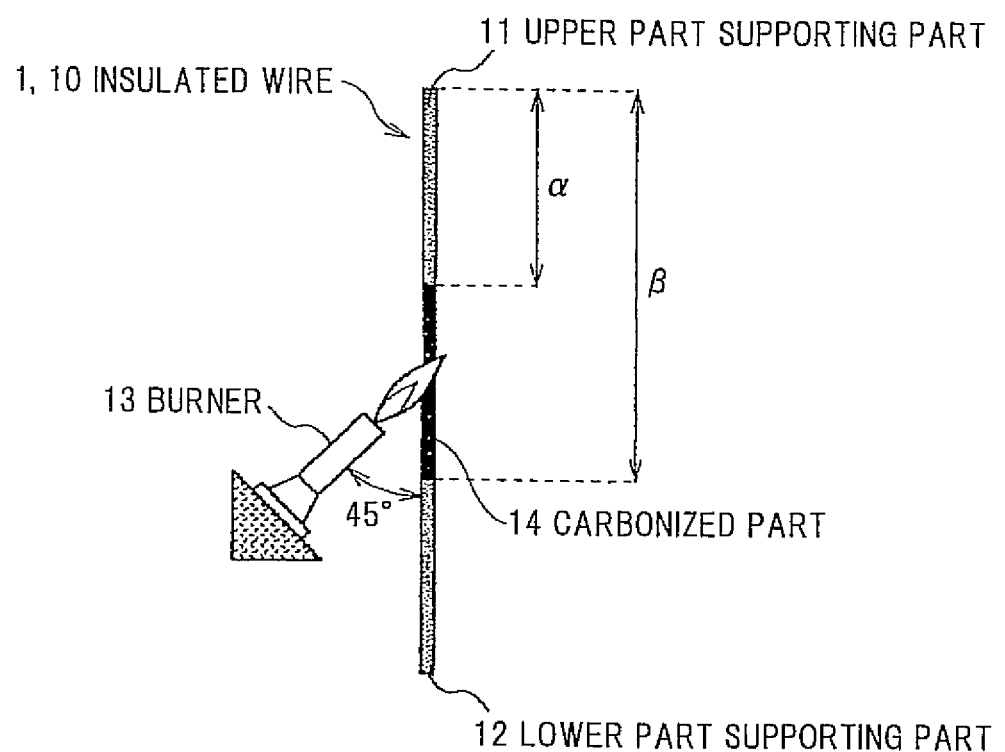

INSULATED WIRE USING A RESIN COMPOSITION

The present application is based on Japanese Patent Application No. 2007-304364 filed on Nov. 26, 2007, the entire contents of which are incorporated herein by reference.

BACKGROUND OF THE INVENTION

1. Field of the Invention

The present invention relates to an insulated wire using a resin composition, and more particularly to an insulated wire using a resin composition that are provided with flame retardant property, heat resistance, hydrolysis resistance, and excellent elongation property, in which the resin composition comprises a polyester resin to which various materials are blended (added) or the polyester resin containing the various materials, and the insulated wire comprises a conductor coated with an insulating material comprising the resin composition.

2. Related Art

Conventionally, insulating materials including a polyvinyl chloride (PVC) resin have commonly and widely been used as an electrical insulator. Such insulating materials containing PVC provide advantages of excellent properties in practical use and low cost. However, they have an environmental pollution problem associated with waste disposal because, e.g., they release a gas containing chloride during incineration. Thus, in recent years, there has been a need for an alternative material that can replace PVC. On the other hand, in the transportation industry such as automobiles and trains, there is a growing requirement for energy conservation by reducing the weight of a vehicle body and by saving space for electrical wiring in a vehicle, which in turn causes a demand for lighter and thinner wires.

In order to meet such demand for lighter and thinner wires, however, there is a disadvantage in use of conventional PVC materials that it is impossible to satisfy the required properties such as flame retardant property and abrasion resistance.

On the other hand, the polyester resins that are a type of general-purpose engineering plastic polymers, particularly polybutylene terephthalates (PBTs), are crystalline polymers and excellent in heat resistance, mechanical strength, electrical properties, chemical resistance and moldability. In addition, the polyester resins have properties of low water-absorbing as well as excellent dimensional stability, and readily achieve the flame retardant property. These features allow the polyester resins to be applied to a wide variety of fields such as vehicles, electrical systems, electronics, insulating materials and office automation systems. For example, JP-B-2968584, JP-B-3590057, JP-A-2002-343141 and JP-B-3650474 disclose the polyester resins. Such general-purpose engineering plastic polymers having the above-mentioned features are expected to provide lighter and thinner wires while maintaining flame retardant property and abrasion resistance.

However, since the polyester resins are crystalline polymers, there is a disadvantage in that a crystallization level is changed during the manufacturing process or under particular environment. In particular, the crystallization undergoes by heat treatment at the time of e.g. extrusion molding. Therefore, it is concerned that degradation of a tensile elongation property that is an essential characteristic as the insulating material for an electric wire.

For example, in JP-A-2006-111655 and JP-A-2006-11873, it is proposed that the crystallization is improved by the heat treatment or addition of a crystallization accelerating agent, in order to improve the mechanical strength, high speed molding property and productivity. However, it is concerned that the elongation property may be deteriorated by the acceleration of the crystallization.

Further, in JP-A-2005-213441, it is proposed to suppress the progression of the crystallization by introducing a flexible monomer as a raw material of the polyester resin. However, JP-A-2005-213441 never discloses the elongation property.

In addition, in JP-A-2004-193117, it is proposed to suppress generation of crazing by adding a resin including a functional group that is reactive with a polyester based resin to the polyester resin, thereby suppressing decrease in an insulation breakdown voltage and providing an excellent high temperature insulation property. However, JP-A-2004-193117 never discloses the elongation property of the insulating material for the electric wire under an influence of the heat treatment.

SUMMARY OF THE INVENTION

Accordingly, it is an object of the present invention to provide an insulated wire using a polyester resin composition, in which the resin composition provided with the flame retardant property, heat resistance, hydrolysis resistance, and excellent elongation property is used as the insulating material for the electric wire, and the insulated wire with high performance is provided.

According to a feature of the invention, an insulated wire comprises:
 a conductor; and
 an insulating material provided on the conductor, the insulating material comprising:
 a resin composition comprising:
 a polyester resin in 100 parts by weight;
 a non-bromine flame retardant agent in 1-30 parts by weight;
 a polyorganosiloxane core-graft copolymer in 1-50 parts by weight;
 an inorganic porous filler in 0.1-50 parts by weight; and
 a hydrolysis resistance modifier in 0.05-10 parts by weight.

In the insulated wire, the polyester resin may comprise a polybutylene terephthalate resin.

In the insulated wire, the non-bromine flame retardant agent may comprise at least one of a phosphorous compound and a nitrogen compound having a triazine ring.

In the insulated wire, the phosphorous compound may comprise a phosphoester compound expressed by a chemical formula (1):

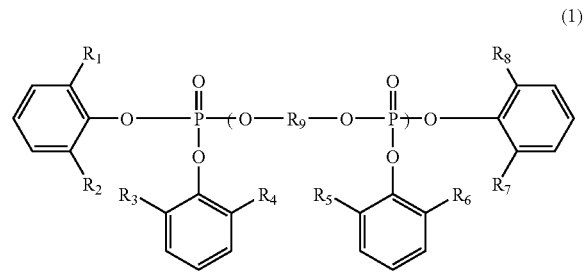

wherein each of R1 ... R8 expresses a hydrogen atom or an alkyl group of carbon number of 6 or less, n expresses an integer of 0 to 10, and R9 expresses a structure selected from a chemical formula (2):

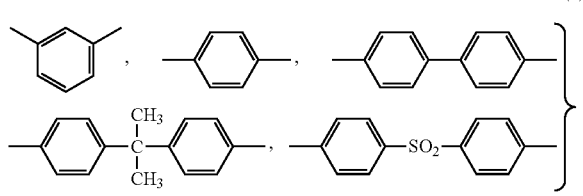

In the insulated wire, the nitrogen compound having the triazine ring may comprise an equimolar reactant of a cyanuric acid and a melamine.

In the insulated wire, the hydrolysis resistance modifier may comprise a carbodiimide compound.

In the insulated wire, a thickness of the insulating material may be 0.1 to 0.5 mm.

EFFECT OF THE INVENTION

According to the present invention, it is possible to provide a polyester resin composition and an insulated wire using the same that are excellent in the flame retardant property, heat resistance, hydrolysis resistance, and elongation property, and therefore can advantageously be applied to electric wires for use in vehicles such as automobiles and trains.

BRIEF DESCRIPTION OF THE DRAWING

A preferred embodiment according to the invention will be described in conjunction with an appended drawing:

FIG. 1 is a schematic diagram for explaining an IEC combustion test method.

DETAILED DESCRIPTION OF THE PREFERRED EMBODIMENT

The preferred embodiment of the present invention will be described in detail below. Firstly, a resin composition in the preferred embodiment according to the invention will be explained below.

(Resin Composition)

The resin composition in the preferred embodiment comprises a base compound (A) and various compounding ingredients blended with the base compound (A). The resin composition comprises the base compound (A) comprising a polyester resin in 100 parts by weight; a flame retardant agent (B) comprising a non-bromine flame retardant agent (b) in 1-30 parts by weight; a resin additive (C) comprising a polyorganosiloxane core-graft copolymer (c) in 1-50 parts by weight; an inorganic porous filler (D) comprising a baked clay (d) or the like in 0.1-50 parts by weight; and (E) a hydrolysis resistance modifier in 0.05-10 parts by weight.

(A) Base Compound

As the base compound (A), it is enough to use the polyester resin that hardly causes the embrittlement and is applicable to an extrusion molding. For example, the polyester resin used in the present invention is preferably polybutylene terephthalate (PBT) resin, polytrimethylene terephthalate resin, polyethylene naphthalate resin, polybutylene naphthalate resin or the like. In this preferred embodiment, the polybutylene terephthalate (PBT) resin is used as the polyester resin, since the PBT resin is excellent in the heat resistance, mechanical strength, electrical properties such as insulating resistance, chemical resistance, and moldability. Further, the PBT resin has a low water absorption property and an excellent dimensional stability. Further, the flame retardation of the PDT resin is relatively easy.

(a) PBT Resin

The PBT resin used in this preferred embodiment is a polyester resin comprises a butylene terephthalate repeat unit as a main component. The main repeat unit of the PBT is the butylene terephthalate unit obtained by using 1,4-butanediol as polyalcoholic component and using terephthalic acid or ester-forming derivative thereof as polyvalent carboxylic acid component.

The "main repeat unit" means that the butylene terephthalate unit is not less than 70 mol % of all polyvalent carboxylic acid-polyalcohol unit. Even more particularly, the butylene terephthalate unit is preferably not less than 80 mol %, and more preferably not less than 90 mol %, and most preferably not less than 95 mol %.

As examples of the polyvalent carboxylic acid used for the PBT resin other than the terephthalic acid, aromatic polyvalent carboxylic acid such as 2,6-naphthalene dicarboxylic acid, 2,7-naphthalene dicarboxylic acid, isophthalic acid, phthalic acid, trimesic acid, trimetacid and the like, aliphatic dicarboxylic acid such as oxalic acid, malonic acid, succinic acid, gurtal acid, adipic acid, suberic acid, azelaic acid, sebacic acid, decanedicarboxylic acid, and the like, alicyclic dicarboxylic acid such as cyclohexanedicarboxylic acid and the like, and ester-forming derivative of the polyvalent carboxylic acid (e.g. low-grade alkyl ester of the polyvalent carboxylic acid such as dimethyl terephthalate) may be used. These polyvalent carboxylic acids may be used alone or different kinds of the polyvalent carboxylic acids may be mixed for the use.

On the other hand, as examples of the polyalcoholic component other than 1,4-butanediol, aliphatic polyalcohol such as ethylene glycol, diethylene glycol, propylene glycol, neopentyl glycol, pentane diol, hexane diol, glycerin, trimethylolpropane, pentaerythritol and the like, alicyclic polyalcohol such as 1,4-cyclohexane dimethanol, aromatic polyalcohol such as bisphenol A, bisphenol Z, and the like, and polyalkylene glycol such as polyethylene glycol, polypropylene glycol, polytetramethylene glycol, polytetrainethylene oxide glycol may be used. The polyalcoholic components may be used alone, and different kinds of the polyalcoholic components may be mixed for the use.

From the view point of the hydrolysis resistance, in the PBT resin used in this preferred embodiment, a terminal-carboxyl group equivalent is preferably not great than 50 (eq/T), more preferably not greater than 40 (eq/T), and most preferably not greater than 30 (eq/T). When the terminal-carboxyl group equivalent exceeds 50 (eq/T), the hydrolysis resistance is deteriorated.

If the aforementioned conditions are satisfied, the PBT resin in this preferred embodiment may be used alone, or may be a mixture of plural materials different from each other in terminal-carboxyl group concentration, melting point, catalyst amount, or the like.

(B) Flame Retardant Agent (b) Non-Bromine Flame Retardant Agent

As a non-bromine flame retardant agent used in this preferred embodiment, known flame retardant agents may be used. For example, the non-bromine flame retardant agent such as phosphorus compound (ester phosphate, phosphonitrile compound, polyphosphate, red phosphorus), nitrogen compound having triazine ring, hydrous inorganic compound and the like may be used. In particular, a phosphoester compound or the nitrogen compound having triazine ring may be preferably used in terms of environmental protection.

As concrete examples of the phosphoester compound, trimethylphosphate, triethyl phosphate, tributylphosphate, trioctylphosphate, tributoxyethyl phosphate, triphenylphosphate, tricredilphosphate, credildiphenylphosphate, octyldiphenylphosphate and the like may be used. In particular, the phosphoester compound expressed by the chemical formula (1) may be preferably used.

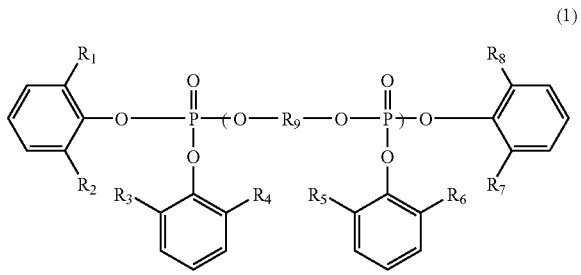

(1)

In the chemical formula (1), each of R1 . . . R8 expresses a hydrogen atom or an alkyl group of carbon number of 6 or less. The alkyl group of the carbon number of 6 or less may be preferably used so as to improve the hydrolysis resistance, particularly, a methyl group may be preferably used. Herein, n expresses an integer of 0 to 10, preferably 1 to 3, and more preferably 1.

In addition, R9 expresses an organic group of divalence or more. For this case, the organic group of divalence or more means a group of divalence or more that is formed by removing one or more hydrogen atom(s) coupled with carbon from alkyl group, cycloalkyl group, aryl group and the like. To be concrete, the structure shown in the chemical formula (2) may be preferably used.

As the phosphorus compound, a phospbonitrile compound (b-2) having a group shown in a chemical formula (3) may be preferably used

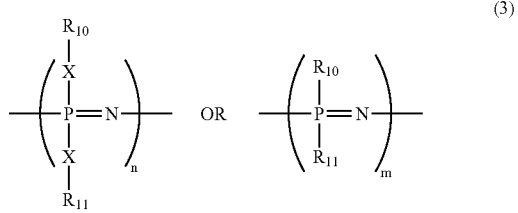

(3)

wherein, X expresses O, S, or N—H atom, R10 and R11 express aryl group, alkyl group, or cycloalkyl group of a carbon number of 1 to 20, —X—R10 and —X—R11 may be identical to each other or different from each other, each of n and m expresses an integer of 1 to 12.

In the chemical formula (3), R10 and R11 express aryl group, alkyl group, or cycloalkyl group of a carbon number of 1 to 20, for example, methyl, ethyl, butyl, hexyl, cyclohexyl, phenyl, benzil, naphtbyl and the like may be used. Herein, each of n and m expresses an integer of 1 to 3 in general, and preferably 3 or 4. In addition, the phosphonitrile compound may be a linear polymer or a ring polymer, and the ring polymer may be preferably used. X expresses O, S, or N—H atom, preferably O, or N—H atom, and more preferably O.

As the polyphosphate, polyphosphoric acid and melamine system compound may be used. To be concrete, polyphosphoric acid melamine, polyphosphoric acid melam, and polyphosphoric acid melem may be used. Otherwise, ammonium polyphosphate may be preferably used. A mean grain diameter of the phosphorus compound is preferably 0.05 to 100 μm, and more preferably 0.1 to 80 μm.

As the nitrogen compound having triazine ring, cyanuric acids, melamines, melamine cyanurates and the like may be used. In particular, the melamine cyanurates may be preferably used. As concrete examples of the cyanuric acids, the cyanuric acid, trimethyl cyanurate, triethyl cyanurate, tri(n-propyl)cyanurate, methyl cyanurate, diethyl cyanurate, isocyanuric acid, trimethyl isocyanate, triethyl isocyanate, tri(n-propyl)isocyanurate, diethyl isocyanurate, methyl isocyanurate and the like may be used.

As the melamines, melamine, melamine derivative, a compound having a structure similar to the melamine, melamine condensate and the like may be used. As concrete examples of the melamines, melamine, anmerid, anmerin, phormoguanamine, guanyl melamine, cyano melamine, aryleguanamine, melam, melem, melon and the like may be used.

As the melamine cyanurates, an equimolar reactant of the cyanuric acids and the melamines may be used. In addition, some of amino groups or hydroxy groups in the melamine cyanurates may be substituted with other substituent groups. In particular, the melamine cyanurate may be obtained, for example, by mixing an aqueous solution of the melamine with an aqueous solution of the cyanuric acid, stirring the solutions at a temperature of 90° C. to 100° C. to allow reaction, and filtering a generated precipitation. The melamine cyanurate is a white solid material. It is preferable to use a commercialized melamine cyanurate or to use a fine powder obtained by crushing the commercialized melamine cyanurate.

As the triazine system flame retardant agent, a compound comprising triazine rings of 2 or more in one molecule, concretely, melamine cyanurate, melam, melem, melon and the like may be used. Since a heat-resistant temperature of these triazine system flame retardant agents is high, there is less troubles such as generation of a decomposed gas at a molding temperature during a coating process, so that these triazine system flame retardant agents are suitable for the coating process.

The non-bromine flame retardant agent used in this preferred embodiment may be at least one kind of material selected from the aforementioned group, or a combination of two or more kinds of materials selected form the aforementioned group. In particular, the phosphoester compound and/or melamine cyanurate shows extremely superior flame retardant effect.

An additive amount of the non-bromine flame retardant agent may be 1.0 to 30 parts by weight to the base compound (A) of 100 parts by weight (wt %), and preferably 3.0 to 25 parts by weight. When the additive amount of the flame retardant agent is less than 1.0 part by weight, the flame retardant property of the resin composition is insufficient. When the additive amount of the flame retardant agent is greater than 30 parts by weight, the mechanical property, the hydrolysis resistance, and the moldability of the resin composition are deteriorated. In the combination of the phosphoester compound and the melamine cyanurates, a blending quantity weight ratio (phosphoester compound/melamine cyanurates) may be 9/1 to 1/9, preferably 8/2 to 2/8, and more preferably particularly 6/4 to 4/6.

(C) Resin Additives (c) Polyorganosiloxane Core Graft Copolymer

The polyorganosiloxane core graft copolymer used in this preferred embodiment may be used as a non-halogen and non-phosphorus system flame retardant agent as well as a resin additive, from which a resin composition with excellent flame retardant property and impact resistance can be obtained.

The "polyorganosiloxane core graft copolymer" in this application means a graft copolymer having a so-called "core-shell" structure in which polyorganosiloxane is contained as a core of the graft copolymer.

This polyorganosiloxane core graft copolymer may be produced, for example, by using a fabrication method described by Japanese Patent Laid-Open No. 2003-238639 (JP-A-2003-238639). In more concrete, the polyorganosiloxane core graft copolymer may be obtained by, in the presence of polyorganosiloxane particles (X) of 40 to 90 parts by weight, polymerizing a first vinyl monomer (Y) of 0.5 to 10 parts by weight, and further polymerizing a second vinyl monomer (Z) of 5 to 40 parts by weight.

(X) Polyorganosiloxane Particles

As to the polyorganosiloxane particles (X), a toluene insoluble quantity (in the case that the polyorganosiloxane particles (X) of 0.5 g are soaked with toluene of 80 mL at a room temperature for 24 hours) is not greater than 95% by weight (wt %), preferably not greater than 50 wt %, and more preferably not greater than 20% in terms of the flame retardant property and the impact resistance.

As examples of the polyorganosiloxane particle (X), poly dimethylsiloxane particle, polymethyl phenyl siloxane particle, dimethylsiloxane-diphenylsyloxane copolymer particle and the like may be used. These polyorganosiloxane particles may be used alone or a combination of two or more kinds thereof may be used.

(Y) First Vinyl Monomer

The first vinyl monomer (Y) is a vinyl system monomer comprising a polyfunctional monomer (y-1) (including polymerizable unsaturated bonds of 2 or more in a molecule) of 100 to 50 wt %, and other copolymerizable monomer (y-2) of 0 to 50 wt %. The first vinyl monomer (Y) is used to increase the flame retardant effect and the impact resistance improving effect.

The first vinyl monomer (Y) comprises the polyfunctional monomer (y-1), preferably of 100 to 80 wt %, and more preferably of 100 to 90 wt %, and the other copolymerizable monomer (y-2), preferably of 0 to 20 wt %, and more preferably of 0 to 10 wt %.

It is preferable to comprise the polyfunctional monomer (y-1) with a ratio of 50 wt % or more, or to comprise the other copolymerizable monomer (y-2) with a ratio of 50 wt % or less, since the impact resistance improving effect of the polyorganosiloxane core graft copolymer that is finally obtained is further improved.

(y-1) Polyfunctional Monomer

The polyfunctional monomer (y-1) is a compound including polymerizable unsaturated bonds of 2 or more in the molecule. For example, allyl methacrylate, triallyl cyanurate, divinylbenzene and the like may be used. These polyfunctional monomers may be used alone or two or more kinds thereof may be used together. In particular, the use of the allyic methacrylate is preferable in terms of the economical efficiency and the effect.

(y-2) Other Copolymerizable Monomer

As concrete examples of the other copolymerizable monomer (y-2), aromatic vinyl monomer such as styrene, vinyl cyanide monomer such as acrylonitrile, methacrylonitrile and the like, acrylic acid ester system monomer such as methyl acrylate, ethyl acrylate, methyl methacrylate, ethyl methacrylate and the like, and carboxyl group-containing vinyl monomer such as (meta)acrylic acid, maleic acid and the like may be used. Two or more kinds of these copolymerizable monomers may be used together.

(Z) Second Vinyl Monomer

The second vinyl monomer (Z) is a component for composing the polyorganosiloxane core graft copolymer (c), and a component for uniformly dispersing the graft copolymers in the thermoplastic resin by ensuring compatibility between the graft copolymer and the thermoplastic resin, when the polyorganosiloxane core graft copolymer (c) is blended with the thermoplastic resin in order to improve the flame retardant property and the impact resistance.

As the second vinyl monomer (Z), the vinyl monomer same as the other copolymerizable monomer (y-2) in the first vinyl monomer (Y), such as methyl methacrylate, butyl methacrylate, styrene, acrylonitrile and the like may be used. Two or more kinds thereof may be used together, In the second vinyl monomer (Z), a solubility parameter is preferably 9.15 to 10.15 $(cal/cm^3)^{1/2}$, more preferably 9.17 to 10.10 $(cal/cm^3)^{1/2}$, and most preferably 9.20 to 10.05 $(cal/cm^3)^{1/2}$. By determining the solubility parameter within the above range, the flame retardant property can be improved.

In more concrete, the polyorganosiloxane core graft copolymer used in this preferred embodiment may be obtained by, in the presence of the polyorganosiloxane particles (X) of 40 to 90 parts by weight, preferably 60 to 80 parts by weight, and more preferably 60 to 75 parts by weight, polymerizing the first vinyl monomer (Y) of 0.5 to 10 parts by weight, preferably 1 to 5 parts by weight, and more preferably 2 to 4 parts by weight, and further polymerizing the second vinyl monomer (Z) of 5 to 50 parts by weight, preferably 15 to 39 parts by weight, and more preferably 21 to 38 parts by weight.

When a percentage of the polyorganosiloxane particles (X) is excessively small or excessively large, the flame retardant effect is deteriorated in both cases.

In addition, when a percentage of the first vinyl monomer (Y) is excessively small, the flame retardant effect and the impact resistance effect are deteriorated. When the percentage of the first vinyl monomer (Y) is excessively large, the impact resistance improving effect is deteriorated.

Further, when the second vinyl monomer (Z) is excessively small or excessively large, the flame retardant effect is deteriorated in both cases.

For providing the polyorganosiloxane core graft copolymer, it is possible to use a known seed emulsion polymerization. For example, the polyorganosiloxane core graft copolymer may be obtained by radical polymerization of the first vinyl monomer (Y), further radical polymerization of the second vinyl monomer (Z), in a latex of the polyorganosiloxane particles (X). The first vinyl monomer (Y) and the second vinyl monomer (Z) may be polymerized in a single stage, or polymerized in two or more stages.

The polyorganosiloxane core graft copolymer obtained by the aforementioned method may be used by separating the polymer from the latex, or may be used as the latex. As the method for separating the polymer, it is possible to use a conventional method, for example, a separating method comprising steps of solidifying the latex by adding metal salt such as calcium chloride, magnesium chloride, magnesium sulfate to the latex, separating the polymer, rinsing the polymer, dehydrating and drying the polymer.

The blending quantity of the polyorganosiloxane core graft copolymer is 1 to 50 parts by weight, preferably 2 to 40 parts by weight, more preferably 3 to 30 parts by weight, and most preferably 5 to 20 parts by weight. When the blending quantity of the polyorganosiloxane core graft copolymer exceeds 50 parts by weight, rigidity is deteriorated. When the blending quantity of the polyorganosiloxane core graft copolymer is less than 1 part by weight, the heat resistance is deteriorated.

(D) Inorganic Porous Filler (d) Baked Clay

The baked clay (d) used in this preferred embodiment is inorganic porous filler, and it is preferable that a specific surface thereof is not less than 5 $m^2/g$. The additive amount of the baked clay (d) to the base compound (A) is preferably 0.1 to 50 parts by weight, and more preferably 0.5 to 10 parts by weight. When the content of the baked clay (d) is less than 0.1 parts by weight, the baked clay (d) cannot trap ions sufficiently, so that the advantage of the present invention is hardly provided. When the content of the baked clay (d) is greater than 50 parts by weight, the dispersibility of the baked clay and the tensile characteristics of the wire are deteriorated. The inorganic porous filler may be zeolite, mesalite (trade name), anthracite, pearlite foam, and activated carbon as well as the baked clay (d).

(B) The Hydrolysis Resistance Modifier

The hydrolysis resistance modifier (E) in this preferred embodiment is a compound for suppressing decrease in the molecular weight and deterioration of the mechanical strength, due to the hydrolysis of PBT by steam or the like. As the hydrolysis resistance modifier (E), conventional ones may be used. Carbodiimide compound, epoxy compound, oxazoline compound, oxazine compound and the like are well known. In particular, the carbodiimide compound is preferably used since the coating characteristics are not deteriorated.

In this preferred embodiment, the carbodiimide compound is a compound having at least two carbodiimide groups (—N=C=N—) in one molecule. For example, the carbodiimide compound can be fabricated by performing the decarboxylizing condensation polymerization reaction (carbodiimide reaction) on the polyvalent isocyanate compound having at least two carbodiimide groups (—N=C=N—) in the molecule in presence of carbodiimide catalyst. The carbodiimide reaction may be performed by known methods. In more concrete, the isocyanate is dissolved in an inactive solvent, or the carbodiimide catalyst such as organic phosphorus compound represented by phosphoreoxide is added to the isocyanate under flow or bubbling of an inactive gas such as nitrogen without using the solvent, then heated at a temperature of 150° C. to 200° C. with stirring, so that the decarboxylation condensation reaction (carbodiimide reaction) can be performed.

As preferred polyvalent isocyanate compound, a bi-functional isocyanate comprising two isocyanate groups in a molecule is particularly preferable, however, a multi-functional isocyanate compound comprising 3 or more isocyanate groups may be used together with diisocyanate. In addition, the polyvalent isocyanate compound may be aliphatic isocyanate, alicyclic isocyanate, or aromatic isocyanate.

As concrete examples of the polyvalent isocyanate, hexamethylene diisocyanate (HDI), hydrogenated xylylene diisocyanate (H6XDI), xylylene diisocyanate (XDI), 2,2,4-trimethyl hexametbylene diisocyanate (TMHDI), 1, 12-diisocyanate dodecane (DDI), norbornane diisocyanate (NBDI), 2,4-bis-(8-isocyanate octyl)-1,3-dioctilcycrobutane (OCDI), 4,4'-dicyclohexylmethanediisocyanate (HMDI), tetramethyl xylylene diisocyanate (TMXDI), isophorone diisocyanate (IPDI), 2,4,6-triisopropyl phenyl diisocyanate (TIDI), 4,4'-diphenyl-methane diisocyanate (MDI), tolylene diisocyanate (TDI), hydrogenated tolylene duisocyanate (HTDI) and the like may be used.

In more concrete, as the carbodiimide compound used in this preferred embodiment, a carbodiimide obtained from HMDI or MDI is preferably used. Alternatively, commercialized carbodiimides such as "Carbodilite" (trade name, product made by Nisshinbo Industries Inc.), "Stabaksol P" (trade name, product made by Rhein Chemie Rheinau GmbH) may be used.

The blending quantity of the hydrolysis resistance modifier to the base compound (A) of 100 parts by weight is 0.05 to 10 parts by weight, and more preferably 0.1 to 5 parts by weight. When the blending quantity of the hydrolysis resistance modifier to the base compound (A) of 100 parts by weight is less than 0.05 parts by weight, the effect of improving the hydrolysis resistance cannot be expected. When the blending quantity of the hydrolysis resistance modifier to the base compound (A) of 100 parts by weight is greater than 10 parts by weight, flowability thereof is deteriorated, thereby deteriorating the moldability of the resin composition.

(F) Others

The method for fabricating the resin composition in this preferred embodiment by blending various compound components to the PBT resin may be performed at an arbitrary stage until a stage just before the coating fabrication by well-known methods. As the simplest method, it is preferable to perform a melt-blending and extrusion process on the PBT resin, the polyorganosiloxane core graft copolymer, and the hydrolysis resistance modifier as well as the non-bromine flame retardant agent, the baked clay and the like to provide pellets. In addition, pigment, colorant, filler, nucleating agent, mold lubricant, antioxidation agent, stabilizer, antistatic agent, lubricant, and well-known additives may be further added to and blended with the resin composition in this preferred embodiment, and these materials may be kneaded.

(Insulated Wire)

The insulated wire in this preferred embodiment comprises a conductor and an insulating material (wire coating material) provided on the conductor, in which the insulating material comprises the resin composition in this preferred embodiment. The conductor may comprise a single-wired conductor, or a stranded or braided conductor comprising plural conductor wires that are stranded or braided with each other.

A thickness of the insulating material of the insulated wire in this preferred embodiment is 0.1 to 0.5 mm in view of the demand for lighter and thinner wires in accordance with reduction in the weight of a vehicle body and the saving space for electrical wiring in a vehicle for energy conservation.

The function and effect of this preferred embodiment will be explained below.

For the resin composition in this preferred embodiment, the PBT resin is used as the polyester resin, and appropriate amounts of the non-bromine flame retardant agent and the polyorganosiloxane core graft copolymer are blended with the PBT resin.

By using this resin composition as the insulating material for the insulated wire that is expected to be lighter and thinner, it is possible to improve the flame retardant property that is sufficient in the case of using only the non-bromine flame retardant agent and to improve the elongation property of the insulated wire after the heat treatment, because of excellent flame retardant property and the impact resistance of the polyorganosiloxane core graft copolymer.

In other words, the insulated wire in this preferred embodiment is excellent in the heat resistance, the flame retardant property and the elongation property, since the resin composition in this preferred embodiment is used as the insulating material, in which the advantage of the PBT is maintained, the disadvantage of the crystalline polymer is compensated, and the characteristics such as the elongation property are improved, mainly by using the polyorganosiloxane core graft copolymer, is used as the insulating material.

The resin composition according to this preferred embodiment is blended with an appropriate amount of the hydrolysis resistance modifier such as the carbodiimide compound. Therefore, the hydrolysis resistance of the insulated wire in this preferred embodiment is excellent.

Therefore, the insulated wire in this preferred embodiment is excellent in the flame retardant property, the heat resistance, the hydrolysis resistance, and the elongation property, and therefore can advantageously be applied to the light and thin electric wires for use in vehicles such as automobiles and trains.

In addition, it is possible to easily provide the non-bromine flame retardant agent which is uniform and with just proportion of the components, when the nitrogen compound having the triazine ring that is used as the non-bromine flame retardant agent to be blended with the resin composition in this preferred embodiment is an equimolar reactant of the cyanuric acid and the melamine. Therefore, the non-bromine flame retardant agent can be uniformly blended in the resin composition.

Further, in the insulated wire in this preferred embodiment, a surface of the insulating material using the resin composition in this preferred embodiment after coating may be further coated with or dipped into the non-bromine flame retardant agent, in order to further improve the flame retardant property.

Still further, in the resin composition in this preferred embodiment, a thermoplastic resin other than the PBT resin may be blended to the extent that does not deteriorate the effect of the present invention. As examples of the thermoplastic resin, polyester resin such as polyethylene terephthalate, poly trimethylene terephthalate, as well as PP (polypropylene)resin, PE (polyethylene)resin, fluorine resin may be used.

In this preferred embodiment, an example in which the resin composition according to this preferred embodiment is used for the insulated wire is explained, however, the present invention is not limited thereto. For example, a cable may be fabricated by using the insulated wire described above. In the case of fabricating the cable, the resin composition in this preferred embodiment may be used as a sheath that is an outermost layer.

EXAMPLES (Preparation of Polybutylene Terephthalate Resin Composition)

In each of Examples 1 and 2 and Comparative examples 1-4, a pelletized polybutylene terephthalate resin composition was prepared by mixing the components in the amounts shown in Table 1, and then by melt kneading the mixture at a cylinder temperature of 260° C., with a screw revolution of 250 rpm and a discharge volume of 15 kg/hrs using a vent type twin screw extruder of 30 mm (twin screw extruder "TEX30HCT" fabricated by Japan Steel Works, Ltd.). The melt-kneaded mixture was then extruded to be a strand, and pelletized by using a strand cutter, to provide the pelletized polybutylene terephthalate resin compositions in the Examples 1 and 2 and the Comparative Examples 1 to 4. The resulting pelletized polybutylene terephthalate resin compositions were dried at a temperature of 120° C. for 6 hours by using a hot-air drier.

TABLE 1

| | | | Example 1 | Example 2 | Comparative Example 1 | Comparative Example 2 | Comparative Example 3 | Comparative Example 4 |
|---|---|---|---|---|---|---|---|---|
| Resin Composition (wt %) | (A) Base Agent | Polybutylene terephthalate | 80.5 | 80.5 | 100 | 82.5 | 81.5 | 81.5 |
| | (B) Flame retardant Agent | Phosphoester | 5 | 5 | — | 5 | 5 | 5 |
| | | Cyanuric acid melamine | 5 | 5 | — | 5 | 5 | 5 |
| | (C) Resin additive | Polyorganosiloxane core-graft copolymer | 7.5 | 7.5 | — | — | — | — |
| | | Ethylene system elastomer | — | — | — | 7.5 | — | 7.5 |
| | | Acrylic system elastomer | — | — | — | — | 7.5 | — |
| | (D) Inorganic porous filler | Baked clay | 1 | 1 | — | — | — | — |
| | (E) Hydrolysis resistance modifier | Carbodiimide compound | 1 | — | — | — | 1 | — |
| | | Epoxy compound | — | 1 | — | — | — | 1 |

Polybutylene terephthalte: "NOVADURAN (registered trademark) 5026" fabricated by Mitsubishi Engineering-Plastics Corporation
Phosphoester: "PX200" fabricated by Daihachi Chemical Industry Co., Ltd.
Cyanuric melamine: "MCA-C0" fabricated by Mitsubishi Chemical Corporation
Polyorganosiloxane core-graft copolymer: "Kane Ace (trademark) MR-01" fabricated by Kaneka Coporation
Ethylene system elastomer: "Paraloid (trade mark) EXL2315" fabricated by Rohm and Haas Japan
Acrylic system elastomer: "Bond-fast (trade name) 7M" fabricated by Sumitomo Chemical Co. Ltd.
Baked clay: "SP-33" fabricated by Engelhard Coporation
Carbodiimide compound: "Carbodilite (trade name) LA-1" fabricated by Nisshinbo Industries, Inc.
Epoxy compound: "ADK STAB EP17" fabricated by Adeka Corporation (Preparation of Electric Wire)

The resulting resin compositions were dried at a temperature of 120° C. for 10 hours in a hot-air thermostatic bath. They were then extruded around a tin-plated soft copper wire with a diameter of 1.3 mm, thereby obtaining an insulated wire having a coating thickness of 0.3 mm. The extrusion molding was performed by using a die with a diameter of 4.2 mm and a nipple with a diameter of 2.0 mm. As to the extrusion temperature, a cylinder temperature was 230 to 260° C. and a head temperature was 260° C. The extrusion rate was 5 m/min. As described above, the insulated wire in each of Examples 1 and 2 and Comparative examples 1 to 4 was prepared.

Following tests and insulative resistance measurements were performed to evaluate the insulated wire in each of the Examples 1 and 2 and the Comparative examples 1 to 4.

(Heat Aging Test)

Samples prepared by removing respective core wires from thus prepared insulated wires were heated in a thermostatic bath at a temperature of 150° C. for 100 hours and then left at a room temperature for 12 hours, and thereafter were tensile tested. The heat treatment was performed according to JIS C 3005 WL1.

(Hydrolysis Resistance Test)

The samples prepared by removing the respective core wires from thus prepared insulated wires were left in a constant temperature and humidity bath of 85° C./85% RH for 30 days, and thereafter were tensile tested. The samples with a tensile elongation of 200% or more were evaluated as "○" (accepted, qualified), the samples applicable to a practical use with a tensile elongation of 100% or more and 200% or less were evaluated as "Δ", and the samples with a tensile elongation of less than 100% were evaluated as "x" (rejected, disqualified).

(Tensile Test)

The samples prepared for the heat aging test were measured for the tensile elongation at a pull rate of 200 mm/min. The tensile test was performed according to JIS C 3005. The samples with the tensile elongation of 200% or more were evaluated as "○" (accepted, qualified), and the samples with the tensile elongation of less than 200% were evaluated as "x" (rejected, disqualified).

(Combustion Test)

FIG. 1 is a schematic diagram for explaining an IEC combustion test method.

As shown in FIG. 1, each of insulated wires 1 in the Examples 1 and 2 and insulated wires 10 of the Comparative examples 1 to 4 was supported by an upper part supporting member 11 and a lower part supporting member 12, then combustion-tested according to the International Electrotechnical Commission (IEC) combustion test (IEC60332-1) with the use of a burner 13. The samples, in which a distance (a) from an upper end of the upper part supporting member 11 to an upper end of a carbonized part 14 at an upper part of the insulated wire 1, 10 is 50 mm or more and a distance (β) from the upper end of the upper part supporting member 11 to a lower end of the carbonized part 14 at a lower part of the insulated wire 1, 10 is 540 mm or less, were evaluated as "accepted" (○). The samples out of the above range were evaluated as "rejected " (X).

(Insulation Resistance Measurement)

The insulated wires thus prepared were dipped into the water at a temperature of 90° C., and the insulation resistance thereof was measured according to JIS C3005 after the temperature of the insulating material (insulator) became constant. The samples with the insulation resistance of 1.0 MO·km or more were evaluated as "accepted".

TABLE 2 is a table showing evaluation results of the respective electric wires in the Examples 1 and 2 and the Comparative examples 1 to 4.

The samples in which all of the heat resistance, flame retardant property, hydrolysis resistance, and tensile elongation after the heat treatment are acceptable are evaluated as "accepted" (○) in a total evaluation, and the other samples are evaluated as "rejected" (x) in the total evaluation.

TABLE 2

|  | Hydrolysis resistance | Flame retardant property | Elongation after heat treatment (%) | Insulation resistance | Accepted or Rejected |
| --- | --- | --- | --- | --- | --- |
| Example 1 | ○ | ○ | 410 | 2.1 | ○ |
| Example 2 | ○ | ○ | 300 | 1.9 | ○ |
| Comparative Example 1 | X | X | 20 | 0.9 | X |
| Comparative Example 2 | X | X | 380 | 0.3 | X |
| Comparative Example 3 | ○ | X | 400 | 0.2 | X |
| Comparative Example 4 | Δ | X | 390 | 0.3 | X |

As shown in TABLE 2, the insulated wires in the Examples 1 and 2 show sufficiently all the hydrolysis resistance, flame retardant property, elongation after the heat treatment (post-heat treatment elongation), and insulation resistance Therefore, the polybutylene terephthalate resin compositions in the Examples 1 and 2 are preferable as the insulating material for the electric wire.

On the other hand, since the sample in the Comparative example 1 does not contain the components (B), (C), (D), and (E), all the hydrolysis resistance, flame retardant property, elongation property after the heat treatment, and insulating resistance are deteriorated.

In the sample in Comparative example 2, the elongation property after the heat treatment (heat aging) is improved by adding the components (B) and (C). However, the flame retardant property is not improved enough, and the combustion of the sample toward the lower part is advanced. In addition, the hydrolysis resistance is not improved.

In the samples in the Comparative examples 3 and 4, the elongation property after the heat aging, the hydrolysis resistance were improved by adding the components (B), (C), and (E), however, the flame retardant property and the insulating resistance are not improved In the sample in the Comparative example 4, the epoxy compound is added as the hydrolysis resistance modifier (E). However, the effect of adding the epoxy compound is small as compared to the carbodiimide compound.

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:

1. An insulated wire comprising:
a conductor; and
an insulating material with which the periphery of the-conductor is coated, the insulating material consisting of:
a resin composition consisting of:
a polybutylene terephthalate resin in 100 parts by weight;
a non-bromine flame retardant agent in 1-30 parts by weight, wherein the non-bromine flame retardant agent consists essentially of at least one of a phosphorous compound, a nitrogen compound having a triazine ring and a hydrous inorganic compound;
a polyorganosiloxane core-graft copolymer in 1-50 parts by weight;
an inorganic porous filler in 0.1-50 parts by weight; and a hydrolysis resistance modifier in 0.05-10 parts by weight, wherein the phosphorous compound comprises a phosphoester compound expressed by a chemical formula (1):

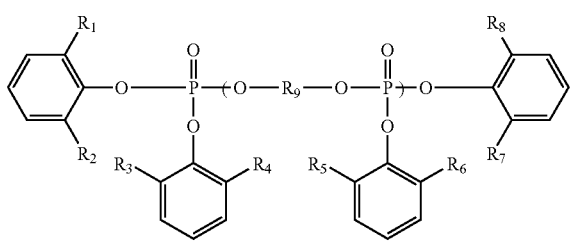

(1)

wherein each of R1 ... R8 expresses a hydrogen atom or an alkyl group of carbon number of 6 or less, n expresses an integer of 0 to 10, and R9 expresses a structure selected from a chemical formula (2):

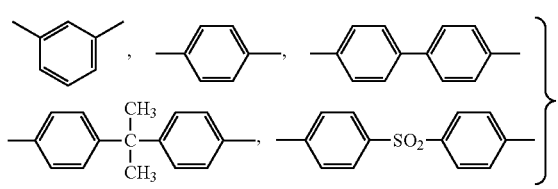

(2)

and wherein the nitrogen compound having the triazine ring comprises an equimolar reactant of a cyanuric acid and a melamine.

2. The insulated wire according to claim 1, wherein the hydrolysis resistance modifier comprises a carbodiimide compound.

3. The insulated wire according to claim 1, wherein a thickness of the insulating material is 0.1 to 0.5 mm.

4. The insulated wire according to claim 1, wherein a specific surface of the inorganic porous filler is not less than 5 $m^2$/g.

5. The insulated wire according to claim 1, wherein the inorganic porous filler comprises baked clay.

6. The insulated wire according to claim 4, wherein the inorganic porous filler comprises baked clay.

7. The insulated wire according to claim 1, wherein the phosphorous compound comprises phosphoester.

8. The insulated wire according to claim 1, wherein the non-bromine flame retardant agent comprises both phosphoester and cyanuric acid melamine.

9. The insulated wire according to claim 1, wherein the resin composition has a tensile elongation of more than 200% after 30 days at 85° C. and 85% relative humidity and has insulation resistance of greater than 1 MO·km in water of 90° C.

* * * * *